US006686965B1

(12) United States Patent
Fujii

(10) Patent No.: US 6,686,965 B1
(45) Date of Patent: Feb. 3, 2004

(54) IMAGE DISPLAY AND IMAGE STORAGE FOR ELECTRONIC CAMERA

(75) Inventor: Yasutoshi Fujii, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/323,912

(22) Filed: Jun. 2, 1999

(30) Foreign Application Priority Data

Jun. 3, 1998 (JP) .......................................... 10-169161

(51) Int. Cl.$^7$ ............................................. H04N 5/222
(52) U.S. Cl. .............................. 348/333.02; 348/333.01
(58) Field of Search .................... 348/333.01, 333.02, 348/333.05, 333.11, 333.12, 231.99, 231.1, 231.2, 207.1

(56) References Cited

U.S. PATENT DOCUMENTS 5,576,758 A  * 11/1996  Arai et al. ............. 348/231.99
5,724,155 A  *  3/1998  Saito ........................ 358/402
6,249,316 B1 *  6/2001  Anderson .............. 348/333.05
6,292,217 B1 *  9/2001  Uehara et al. .......... 348/333.02
2002/0033960 A1 *  3/2002  Kazami ..................... 358/1.14

FOREIGN PATENT DOCUMENTS

JP          04-205855       *  7/1992

* cited by examiner

Primary Examiner—Aung Moe
(74) Attorney, Agent, or Firm—Finnegan, Henderson, Farabow, Garrett & Dunner, LLP

(57) ABSTRACT

An electronic camera which photographs images of an object, outputs image signals corresponding to the images, and stores the image signals with an assigned file name. A display on the electronic camera displays images corresponding to the stored image signals. Along with each displayed image signal, the electronic camera's display also displays the assigned file name and a frame number. If a user chooses to delete a particular image, the frame numbers for stored image signals following the deleted image are advanced by one, in order to maintain an unbroken numerical sequence. The file names assigned to each stored image signal will remain unchanged.

9 Claims, 5 Drawing Sheets

FIG. 2 (a-1)
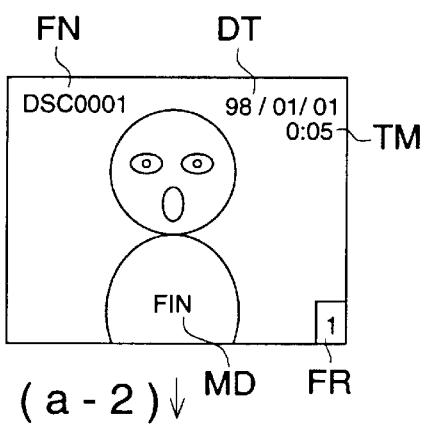
FIG. 2 (b-1)
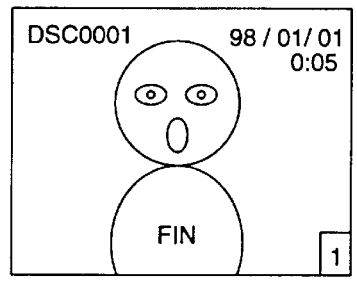
FIG. 2 (a-2)↓
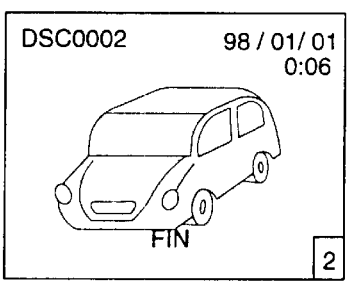
FIG. 2 (b-2)↓
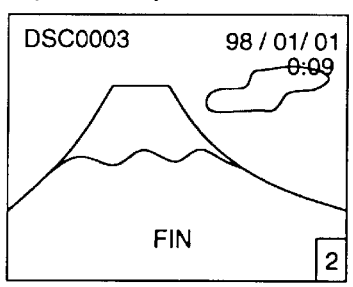
FIG. 2 (a-3)↓
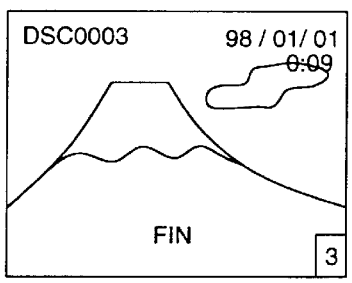
FIG. 2 (b-3)↓
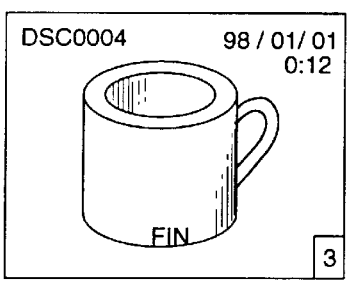
FIG. 2 (a-4)↓
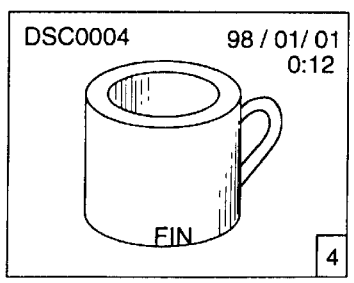
FIG. 2 (c-1)↓
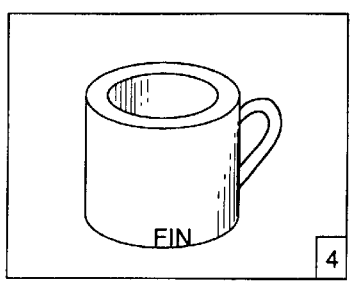

FIG. 2 (d-1)
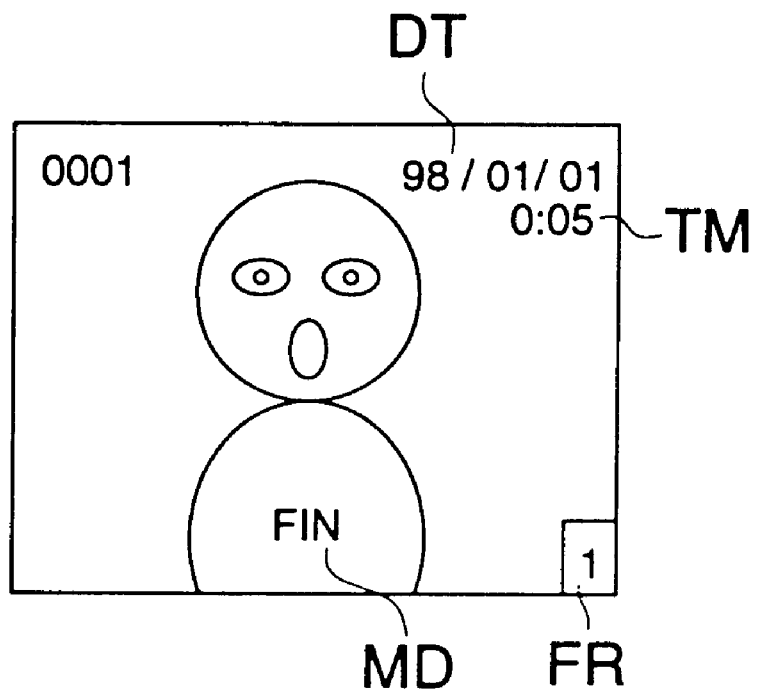

IMAGE DISPLAY AND IMAGE STORAGE FOR ELECTRONIC CAMERA

BACKGROUND OF THE INVENTION

The present invention relates to an electronic camera, and more particularly, to an electronic camera capable of displaying information about images.

With an improvement of electronic technologies, an electronic camera wherein images obtained through photographing are converted into digital data and are stored has been developed and put on the market. A user can display the images obtained by an electronic camera through photographing on the screen of the user's own personal computer, for example, and it is further possible for the user to make prints of the images through a printer, thus, a range of application of the electronic camera is broad.

For example, image data obtained by an electronic camera through photographing are stored temporarily in a recording medium such as a memory card, and yet they can be accessed at any time as an image through a liquid crystal monitor equipped. A memory card generally has memory capacity to store image data related to images for about 20 sheets or more. Therefore, a user stores image data covering plural images in one memory card.

Incidentally, there has already been put on the market an electronic camera wherein images obtained through photographing and frame numbers each being advanced by one frame in the photographing order can be displayed. On the other hand, there is already available on the market an electronic camera to store after giving a file name specific to image signals corresponding to images. In such an electronic camera, it is possible for a user to select and display specific images on the electronic camera or on a personal computer, based on a frame number or a file name. In the case of an electronic camera in the prior art, therefore, either a frame number or a file name is displayed together with images to meet the convenience of a user in selection of images.

On the other hand, there sometimes arises an occasion where useful images only are to be stored because capacity of a memory card is limited as stated above. In the case of an electronic camera in the prior art, therefore, there is provided an erasing button so that a user can select specific images (namely, image signals) and erase them by operating the erasing button.

However, images succeeding the erased image are advanced in succession without making the erased image to be a skipped number, because the frame numbers stated above are easier to understand for a user when they are serial numbers. On the other hand, since a file name is specific to an image signal, when a corresponding image is erased, a file name is also erased, and the same file name is never used in principle. Therefore, when an image is erased, there is caused divergence in a corresponding relation between a frame number and a file name, which is feared to make a user to be confused.

SUMMARY OF THE INVENTION

In view of the problem in the prior are stated above, an object of the invention is to provide an electronic camera which offers convenience to a user in specifying images.

To attain the object mentioned above, an electronic camera of the invention has therein a photographing means which photographs images of an object and outputs image signals corresponding to the images, a storage means which gives a file name and stores for each image corresponding to the image signals outputted by the photographing means, and a display which displays images based on image signals stored in the storage means, and it is characterized in that the display displays each image together with a frame number and a file name both corresponding to the image.

Or, an electronic camera of the invention has therein a photographing means which photographs images of an object and outputs image signals corresponding to the images, a storage means which gives a file name and stores for each image corresponding to the image signals outputted by the photographing means, and a display which displays images based on image signals stored in the storage means, and it displays each image together with information corresponding to a frame number and a file name both corresponding to the image.

In an electronic camera of the invention, there is further an example wherein information corresponding to the file name is partial information in the file name, and an erasing means to erase image signal corresponding to the image and a changing means which reassigns the frame number when the image signal is erased by the erasing means, are provided.

In the electronic camera of the invention, the display mentioned above displays each image, a frame number and a file name both corresponding to the image, or information corresponding to the file name. Therefore, even when an image is erased and thereby the corresponding relation between the frame number and the image before erasing of the image is different from that after erasing of the image, a user can specify the image easily by observing the display.

Each of FIGS. 2(*a*-1)–2(*d*-1) are diagrams each showing an example of an image displayed by display 9.

Figure 3:
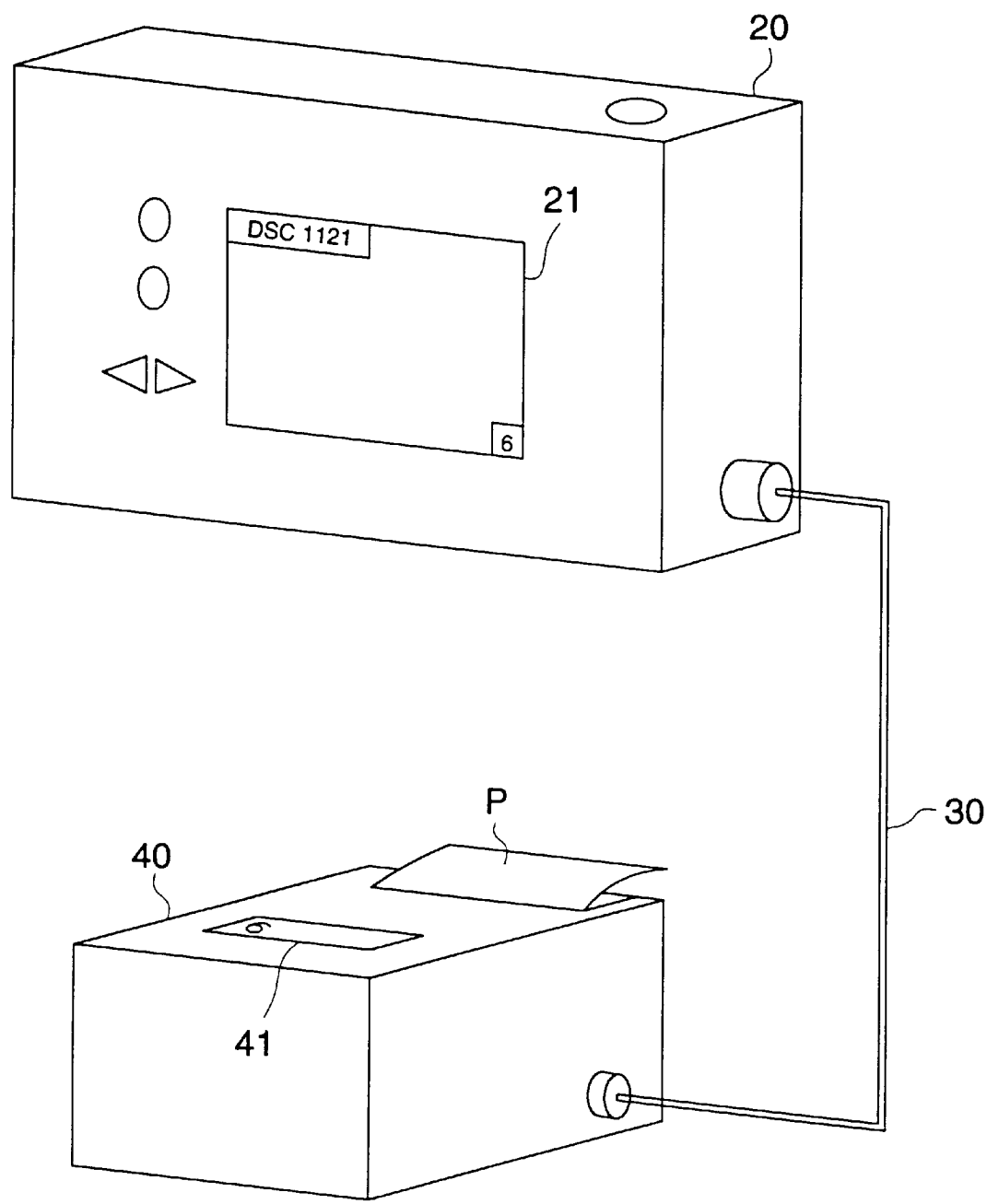

FIG. 3 is a perspective view showing an electronic camera and a printer both showing another embodiment.

Figure 4:
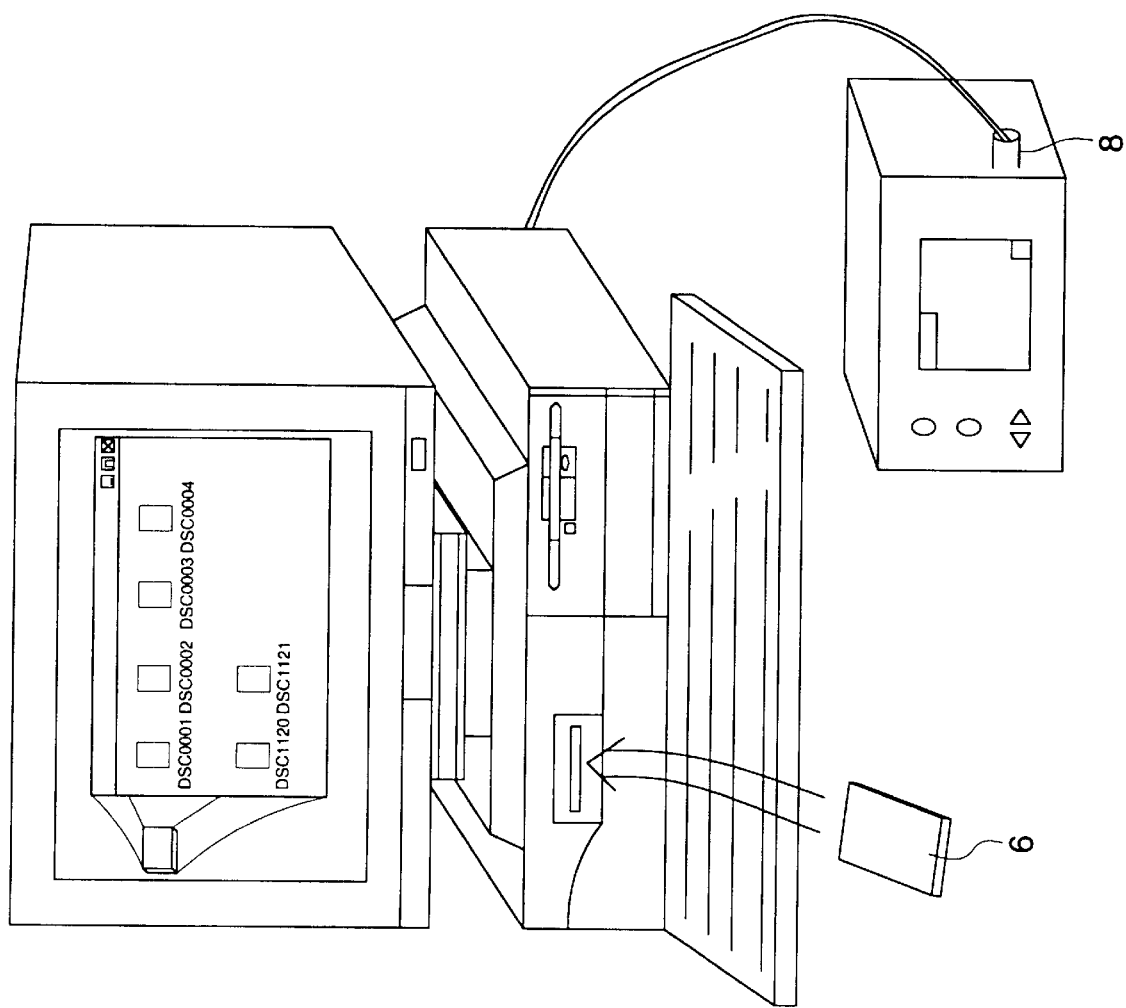

FIG. 4 is a diagram showing how an electronic camera of the present embodiment is connected to a personal computer.

DETAILED DESCRIPTION OF THE INVENTION

An embodiment of the invention will be explained as follows, referring to the drawings.

Figure 1:
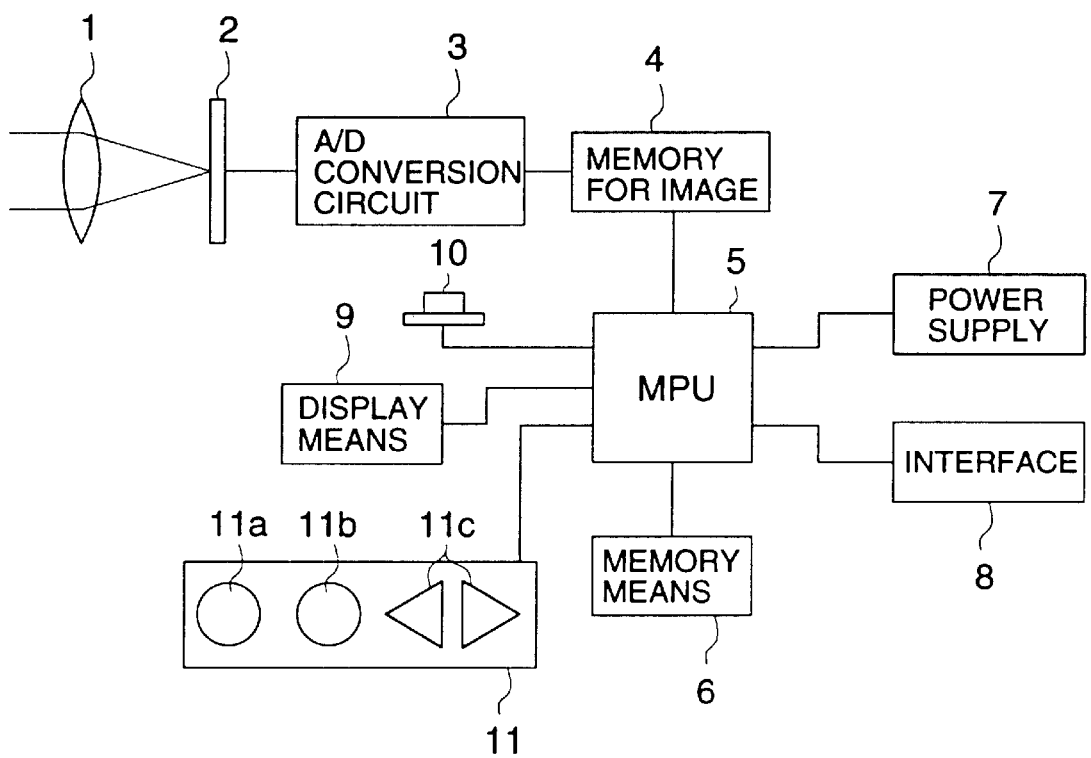
FIG. 1 is a block diagram showing the structure of an electronic camera related to the present embodiment.

FIG. 1 is a block diagram showing the structure of an electronic camera related to the present embodiment. In FIG. 1, photoelectric conversion means 2 representing an image pick-up means in which an optical image is formed by camera lens 1 on the light receiving surface is one to conduct the so-called photoelectric conversion which means to convert the optical image of an object into an amount of electric charges corresponding to the optical image, while A/D conversion unit 3 is one to convert an analog signal inputted from the photoelectric conversion means 2 into a digital signal to output it. Image data thus obtained through the A/D conversion circuit 3 are stored temporarily in memory for image 4.

Image data stored in the memory for image 4 are subjected to various types of image processing by MPU 5, and are finally stored in memory means 6 such as a memory card connected to MPU 5. Incidentally, the MPU 5 is arranged to receive electric power from power supply 7 such as a built-in battery and to transmit an image signal to an external personal computer through interface unit 8. Further the MPU 5 is arranged to receive a release signal from release button 10 and to drive an unillustrated shutter unit for image pick-up.

Since the memory means 6 is constituted with a memory card capable of being removed from a camera, image data recorded can be read when they are stored in a form of a data file for each image and when the data file is inserted directly into the interface of a personal computer. FIG. 4 is an illustration wherein image data recorded by an electronic camera of the invention are read by a personal computer. As is shown in FIG. 4, when interface unit 8 of an electronic camera is connected to a personal computer by a cable to transmit image data, or when memory means 6 such as a memory card is directly inserted in the interface of a personal computer, each image data are displayed on a screen of the personal computer as an image file accompanied by a file name.

In addition, the MPU 5 controls to drive display 9 such as a liquid crystal monitor to make it display images. The MPU 5 is connected with display operating system 11, and is arranged to read image signals from memory means 6 in response to pressed reproduction button 11a to make the display 9 to display. Further, in response to pressed frame advancing button 11c, the MPU 5 advances the frame in the regular direction or in the reverse direction for the displayed image, and erases image signals corresponding to the displayed images from the memory means 6 in response to pressed erasing button 11b.

FIG. 2 is a diagram showing an example of an image displayed by display 9. Examples of display related to the present embodiment will be explained as follows, referring to FIGS. 1 and 2. First, let it be assumed that 4 sheets of images (FIG. 2(*a*-1)–FIG. 2(*a*-4)) are picked up by an electronic camera. An image signal corresponding to each image is given a specific file name (DSC0001–DSC0004), and is stored in memory means 6.

A user who wants to look the image thus picked up has only to press reproduction button 11a. Due to this, MPU 5 of the electronic camera displays an image (FIG. 2(*a*-1)) picked up first on the screen of display 9. The MPU 5 displays, as information relating to images, the file name FN on the upper left of the screen, the image pick-up date DT and the time TM on the upper right of the screen, the display mode MD (FIN means a high image quality mode) on the lower central portion on the screen, and frame number FR on the lower right on the screen, together with images. Incidentally, the frame number is not one stored to be corresponded to each image, but is a value obtained by counting, on a time series basis, the number of images stored in memory means 6 in the state of image signals.

Incidentally, though there is explained an example wherein images and file name FN are displayed in the present embodiment, it is also possible to display images and information corresponding to the file name. Information corresponding to the file name can be one with which a user can grasp the corresponding file name. For example, information corresponding to the file name can be partial information among file name FN as shown in FIG. 2(*d*-1). Due to this, when a file name is long, it is possible to restrain disturbance of visual recognition of images caused by the file name which is lengthy and occupies an display area of an image display.

Further, for example, information corresponding to the file name can include at least a part of file name FN.

For example, if file name FN is "DSC0001", information corresponding to the file name can be "ABC0001" or "ABCDSC0001".

Further, each time a user presses frame advancing button 11c, the screen on the display 9 is switched in succession from FIG. 2(*a*-1) to FIG. 2(*a*-4) so that each frame may display an image. When the frame advancing button 11c is further pressed in the regular direction from the screen shown in FIG. 2(*a*-4), the screen returns to one shown in FIG. 2(*a*-1). Namely, in the present embodiment, a user observes the file name FN or frame number FR shown together with images, and then can estimate, to a certain extent, the image picked up before or after that frame number. Incidentally, the file name is generally used when reading image signals in a personal computer, while the frame number is used to grasp how many images were picked up from the beginning before a certain image picked up.

When no image is erased, file name FN and frame number FR are counted up one by one without any skipped number in accordance with the number of images picked up as shown in FIGS. 2(*a*-1)–2(*a*-4). However, a user sometimes wants to erase images.

For example, let it be assumed that a user wants to erase an image of frame number 2 (file name DSC0002). In this case, the user presses frame advancing button 11b to display an image shown in FIG. 2(*a*-2)), and then presses erasing button 11b, thus, the image of the frame number 2 is erased from memory means 6. However, if s frame number is made to be a skipped number when the image corresponding to the frame number is erased, the number of sheets of images stored in memory means 6 becomes obscure, resulting in a fear that a user is confused.

In the present embodiment, therefore, when an image is erased, an image following the erased image is advanced so that no skipped number may be generated. For example, images displayed respectively in screens shown in FIG. 2(*a*-3) and FIG. 2(*a*-4) are respectively the same as those displayed in screens shown in FIG. 2(*b*-2) and FIG. 2(*b*-3), but their frame numbers are respectively advanced by one. Therefore, a user can estimate that three sheets of images are currently stored in memory means 6, by observing frame numbers. Incidentally, MPU 5 can advance the frame number quickly by counting again after searching quickly the images stored in memory means 6 as image signals in response to image erasing.

On the other hand, when the frame number is advanced by one as stated above, the relation between the file name FN and frame number FR is disturbed, but no serious confusion is considered to be generated, because the file name is generally used in a personal computer and the frame number is used on the part of the electronic camera. Though the file names can be reassigned in an ascending order theoretically, it takes time and it is considered to be unpractical because all of the stored image signals need to be read and updated.

Further, the MPU 5 is arranged to count the time period from the moment when frame advancing button 11c is released from pressing, and to stop displaying file name FN, date DT and time TM when the aforesaid time period exceeds 3 seconds. Due to this, information displayed on the screen of display 9 is made to be less so that the displayed information may not cause troubles when a user appreciates images. Incidentally, even in this case, the frame number FR is not on a non-display mode so that a user can recognize quickly the number of the image which is appreciated by the user. Further, mode name MD is also made not to be on a non-display mode to give a user facilities.

FIG. 3 is a perspective view showing an electronic camera and a printer both showing another embodiment. Electronic camera 20 is connected to printer 40 through cable 30. The electronic camera 20 has therein liquid crystal monitor 21, while the printer 40 has therein liquid crystal display plate 41 which can display only letters or numerals.

In the present embodiment, it is possible for electronic camera 20 to transmit information relating to frame numbers together with image signals to printer 40 through cable 30. The printer 40 prints images on image forming medium P such as a sheet of paper based on image signals transmitted.

When making the printer 40 to select a specific image and to print it in this case, it is necessary to display information needed by a user to specify an image on liquid crystal display board 41 of the printer 40. However, since a file name is specific to an image, many images are erased, and when images are picked up newly, numbers included in file names corresponding to the images are increased. Therefore, even when DSC1121 which means the sixth sheet image, for example, is displayed on the liquid crystal display board 41, a user can not specify the image immediately.

Contrary to the foregoing, in the present embodiment, electronic camera 20 transmits information relating to the frame number together with image signals, and printer 40, on the other hand, displays the frame number (6 in FIG. 3) corresponding to the image to be printed on liquid crystal display board 41. Therefore, a user can recognize that the image to be printed is one on the sixth sheet, by observing the display, thereby it is easy to specify the image.

Though the invention has been explained above, referring to the embodiment, the invention should not be construed to be limited to the embodiment, and appropriate modification and improvement are naturally possible. For example, in place of the file name, the frame number may also be made to be on a non-display mode after a certain period of time from the moment when pressing of a frame advancing button is suspended, as shown in FIG. 2(c-1).

Since a display displays each image together with a frame number and a file name both corresponding to the image in the electronic camera of the invention, a user can easily specify the image by observing the display, even when the erasing of an image changes the corresponding relation between the frame number and the image before the image erasing to be different from that after the image erasing.

What is claimed is:

1. An electronic camera, comprising:

a photographing means for photographing images of an object so as to output image signals corresponding to said images;

a storage means for storing said images, each having corresponding image signals outputted by said photographing means, in a file form with giving a file name thereto;

a display for displaying said images based on image signals stored in said storage means;

wherein said display displays each one of said images together with corresponding frame number and file name; and said display stops displaying said corresponding file name on corresponding still image of said images a predetermined period after each of said images is displayed.

2. The electronic camera of claim 1, comprising:

an erase means for erasing image signals corresponding to said images; and a compensation means for renumbering frame numbers of said images, stored in said storage means, when image signals corresponding to at least one of said images is erased by said erase means.

3. The electronic camera of claim 1, comprising:

an outputting means for transmitting each one of said images together with said corresponding file name to outside of the electronic camera.

4. The electronic camera of claim 1, comprising:

an outputting means for transmitting each one of said images together with said corresponding frame number to outside of the electronic camera.

5. An electronic camera, comprising:

a photographing means for photographing images of an object so as to output image signals corresponding to said images;

a storage means for storing said images, each having corresponding image signals outputted by said photographing means, in a file form with giving a file name thereto, and;

a display for displaying said images based on image signals stored in said storage means;

wherein said display displays each one of said images together with information based on corresponding frame number and file name;

and said display stops displaying said information on corresponding still image of said images a predetermined period after each of said images is displayed.

6. The electronic camera of claim 5, wherein said information based on corresponding file name is a part of said corresponding file name.

7. The electronic camera of claim 6, comprising:

an erase means for erasing image signals corresponding to said images; and a compensation means for renumbering frame numbers of said images, stored in said storage means, when image signals corresponding to at least one of said images is erased by said erase means.

8. The electronic camera of claim 6, comprising:

an outputting means for transmitting each one of said images together with information based on said corresponding file name to outside of the electronic camera.

9. The electronic camera of claim 6, comprising:

an outputting means for transmitting each one of said images together with said corresponding frame number to outside of the electronic camera.

* * * * *